US012793066B1

(12) United States Patent
Adam et al.

(10) Patent No.: US 12,793,066 B1
(45) **Date of Patent: *Nov. 10, 2026**

(54) METHOD AND APPARATUS FOR DIGITAL IDENTITY AUTHENTICATION

(71) Applicant: UIPCO, LLC, San Antonio, TX (US)

(72) Inventors: Patrick Adam, San Antonio, TX (US); Dustin Starr Trimmier, San Antonio, TX (US); Steven Gonzalez, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/974,934

(22) Filed: Dec. 10, 2024

Related U.S. Application Data

(60) Division of application No. 18/419,834, filed on Jan. 23, 2024, now Pat. No. 12,260,409, which is a division of application No. 17/820,793, filed on Aug. 18, 2022, now Pat. No. 11,954,684, which is a continuation of application No. 16/863,487, filed on Apr. 30, 2020, now Pat. No. 11,488,165.

(60) Provisional application No. 62/841,286, filed on May 1, 2019.

(51) Int. Cl.
*G06Q 20/40* (2012.01)
*G06Q 20/10* (2012.01)

(52) U.S. Cl.
CPC ....... *G06Q 20/4014* (2013.01); *G06Q 20/108* (2013.01)

(58) Field of Classification Search
CPC ......................... G06Q 20/4014; G06Q 20/108
See application file for complete search history.

(56) References Cited

U.S. PATENT DOCUMENTS

| | | | | |
|---|---|---|---|---|
| 9,053,304 | B2 * | 6/2015 | Ronda | H04L 63/0853 |
| 10,171,476 | B2 * | 1/2019 | Khan | H04L 9/3234 |
| 2018/0165680 | A1 * | 6/2018 | Sharma | G06Q 20/3223 |
| 2019/0089702 | A1 * | 3/2019 | Bhatt | G06Q 50/265 |
| 2020/0184049 | A1 * | 6/2020 | Toth | H04L 67/306 |

* cited by examiner

*Primary Examiner* — Scott C Anderson
(74) *Attorney, Agent, or Firm* — Plumsea Law Group, LLC

(57) ABSTRACT

A system and method for providing proof of a digital identification of a user which may include activating, on a mobile computing device, a bank application and a digital identification service provider application, and which may allow the bank application to have access to user accounts after the bank application receives a digital identification from the digital identification service provider application in order to provide proof of identify with speed and security.

14 Claims, 13 Drawing Sheets

METHOD AND APPARATUS FOR DIGITAL IDENTITY AUTHENTICATION

CROSS-REFERENCE TO RELATED APPLICATIONS

This application is a Divisional of U.S. application Ser. No. 18/419,834 filed Jan. 23, 2024 and titled "Method and Apparatus for Digital Identity Authentication", which is turn is a Divisional of U.S. application Ser. No. 17/820,793 filed Aug. 18, 2022 and titled "Method and Apparatus for Digital Identity Authentication", which in turn is a Continuation of U.S. application Ser. No. 16/863,487 filed Apr. 30, 2020, and titled "Method and Apparatus for Digital Identity Authentication"; which in turn claims the benefit of Provisional Patent Application No. 62/841,286 filed May 1, 2019, and titled "Method and Apparatus for Digital Identity Authentication," each of the entirety of which are incorporated by reference herein.

TECHNICAL FIELD

The present disclosure generally relates to methods and systems for providing proof of a digital identification of a user, and in particular for providing proof of a digital identification of a user for a banking application.

BACKGROUND

Methods and apparatuses of providing proof of an identify of a user (user identification) may occur by supplying a passport, driver license or other reliable document (e.g. other government issued identification). Proof of identity may also require other information which is not presented on the government identification. Frequently, proof of identity is offered initially to an organization such as a bank or other financial institution to establish an account. Thereafter, a shortcut to verifying an identification (authentication) is used so that the organization can conduct business with you without the time-consuming requirements of establishing proof of identity for each transaction. Authentication is the short cut process of proving an identity, and there are several ways this short cut process to prove identity can be implemented. For example, a bank may require biometric authentication such as facial recognition, fingerprint recognition, or voice recognition. A bank may require a user to enter a password followed by entry of security code, which was forwarded electronically to the user by email, text messaging, etc. after the user properly entered the password. Because proof of identify for each transaction is time consuming and proof of identity is more secure than the shortcut of authentication, there is a need for a new method and system for providing proof of identity of a user quickly and securely.

There is a need in the art for a system and method that addresses the shortcomings discussed above.

SUMMARY

In one aspect, there is provided a method for providing proof of a digital identification of a user including activating, on a mobile computing device, a bank application and a digital identification service provider application, and allowing the bank application to have access to user accounts after the bank application receives a digital identification from the digital identification service provider application. The bank application may be configured receive a digital identification selection from the user of the mobile computing device, scan the mobile computing device to search for digital identification service provider applications stored on the mobile computing device, output a list of digital identification service provider applications using the mobile computing device, receive a selection of one of the digital identification service provider applications from the outputted list, and transmit identification verification request from the bank application to the selected digital identifier provider application to request the digital identification of the user. The selected digital identification service provider application may be configured to receive the transmitted identification verification request from the bank application, receive required authentication information entered by the user using the mobile computing device, grant the bank application access to the digital identification of the user when the required authentication information is accurate, and transmit the digital identification to the bank application after granting the bank application access.

In another aspect, there is provided a method for providing proof of a digital identification of a user including activating, on a mobile computing device, a bank application which is configured to: receive a selection of a digital identification service provider application from a list of digital service provider applications, and transmit an identification verification request from the bank application to the selected digital identifier provider application to request a digital identification of the user; activating, on the mobile computing device, the selected digital identification service provider application, which is configured to: receive the transmitted identification verification request from the bank application, receive required authentication information entered by the user using the mobile computing device, grant the bank application access to the digital identification of the user only when the required authentication information is accurate, and transmit the digital identification to the bank application after granting the bank application access; and allowing the bank application to have access to user accounts after the bank application receives the transmitted digital identification.

In another aspect, there is provided a mobile computing device for obtaining proof of a digital identification comprising at least one memory comprising instructions and at least one hardware processor to execute the instructions within the at least one memory to implement activating, on a mobile computing device, a bank application and a digital identification service provider application and allow the bank application to have access to user accounts after the bank application receives the digital identification from the digital identification service provider application. The bank application may be configured to receive a digital identification selection form the user of the mobile computing device, scan the mobile computing device to search for digital identification service provider applications stored on the mobile computing device, output a list of digital identification service provider applications using the mobile computing device, receive a selection of one of the digital identification service provider applications from the outputted list, and transmit identification verification request from the bank application to the selected digital identifier provider application to request the digital identification of the user. The selected digital identification service provider application may be configured to receive the transmitted identification verification request from the bank application, receive required authentication information entered by the user using the mobile computing device, grant the bank application access to the digital identification of the user when the required authentication information is accurate, and transmit the digital identification to the bank application after granting the bank application access.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Embodiments provide systems, devices, and methods for providing proof of a digital identification (digital identity) of a user by merging authentication and proof of identity to provide a faster and more secure system to provide an authentic digital identification, which can be reliably used by organizations such as banks. An authentic digital identification provides proof of identity and there are digital identification service providers which provide proof of identity. Examples of digital identification service providers who provide digital identification include a department of motor vehicles (DMV), department of homeland security (DHS), and department of defense (DOD). The DMV of each state issues a driver's license. Although the State Department issues passports, the DHS is involved in the passport process. In exemplary embodiments discussed below, the DMV may be used as an example of a digital identification service provider. However, other digital identification service providers which can provide reliable digital identification are available such as other state and federal agencies.

In one or more embodiments, private sector organizations such as financial institutions (including banks) may work with identification verification organizations, which communicate with one or more digital identification service providers. For example, an identification verification organization may communicate with a digital identification service provider to obtain proof of identity of a person, and the verification organization may communicate with a bank to provide a digital identification (digital identity) as the proof of identity to the bank. Alternatively, a bank may obtain a digital identification directly from a digital identification service provider such as a state or federal agency.

Figure 1:
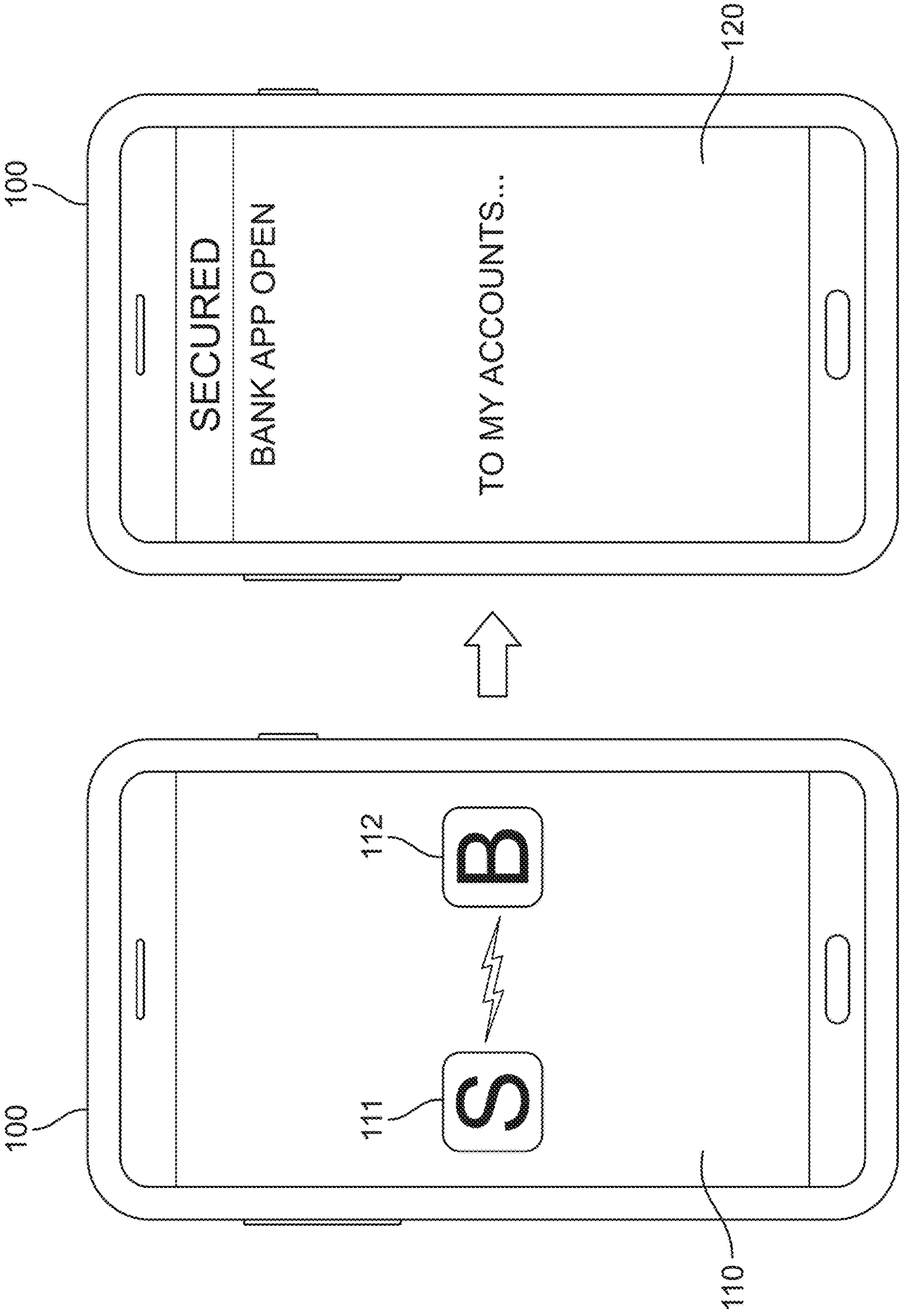
FIG. 1 is a schematic view of a mobile computing device according to an embodiment.

FIG. 1 is a schematic view of a mobile computing device according to an embodiment. A mobile computing device 100 has a display screen 120 showing a first display image 110 which displays a security application 111 and a bank application 112. After the bank application 112 obtains a digital identification (digital identity) of a person using the mobile computing device 100 (user) from the security application 111, the bank application 112 may allow the user to access one or more accounts of a bank associated with the bank application. Although mobile computing device 100 is shown as a smartphone in FIG. 1, examples of mobile computing devices may include a smartphone, a tablet, a smartwatch, a smart glass, a smart helmet, and a laptop. Although embodiments refer to the use of mobile computing devices, any computing device could run software applications in embodiments of the present application.

A digital identification (a digital identity) may include one or more bundles of data from a digital identity profile, which may include data regarding a driver's license, passport, a credit score, a credit history, financial assets, an employment history, education background, medical history, and other information related to a person. In order to open an account with a bank for example, the bank may request one or more data bundles of a digital identity profile to provide proof of a person's identity, which is a digital identification (digital identity). An identification verification organization may gather information to build a digital identity profile from a number of sources such as the DMV which provides a driver's license. The identification verification organization may be contacted by the bank to provide a digital identification (digital identity) customized to meet the needs of the bank. For example, in order to open a new account, the bank may only require some of the above data such as a driver's license, a credit score, financial assets, and employment history as proof of the authenticity of a digital identity. In another example, a hospital may wish to require a driver's license, credit score, and a medical history as proof of identification. The digital identity profile may be updated by the identification verification organization based on a predetermined schedule. For example, an identification verification organization may check once a day as to whether there has been a change in a driver's license or credit score by accessing a digital identification service provider such as the DMV once a day.

With respect to accessing a bank application112 by a user of the mobile computing device 100, one or more embodiments may use a digital identification provided by security application 111 to access one or more accounts of the user at the bank instead of using biometric authentication (such as facial recognition, fingerprint recognition, or voice recognition) or entering a password followed by entry of security code, which was forwarded electronically to the user by email, text messaging, etc. after the user properly entered the password. Instead, the digital identification provides a quicker a more secure method of accessing the accounts of a user than the biometric or password/security identification methods.

Figure 2:
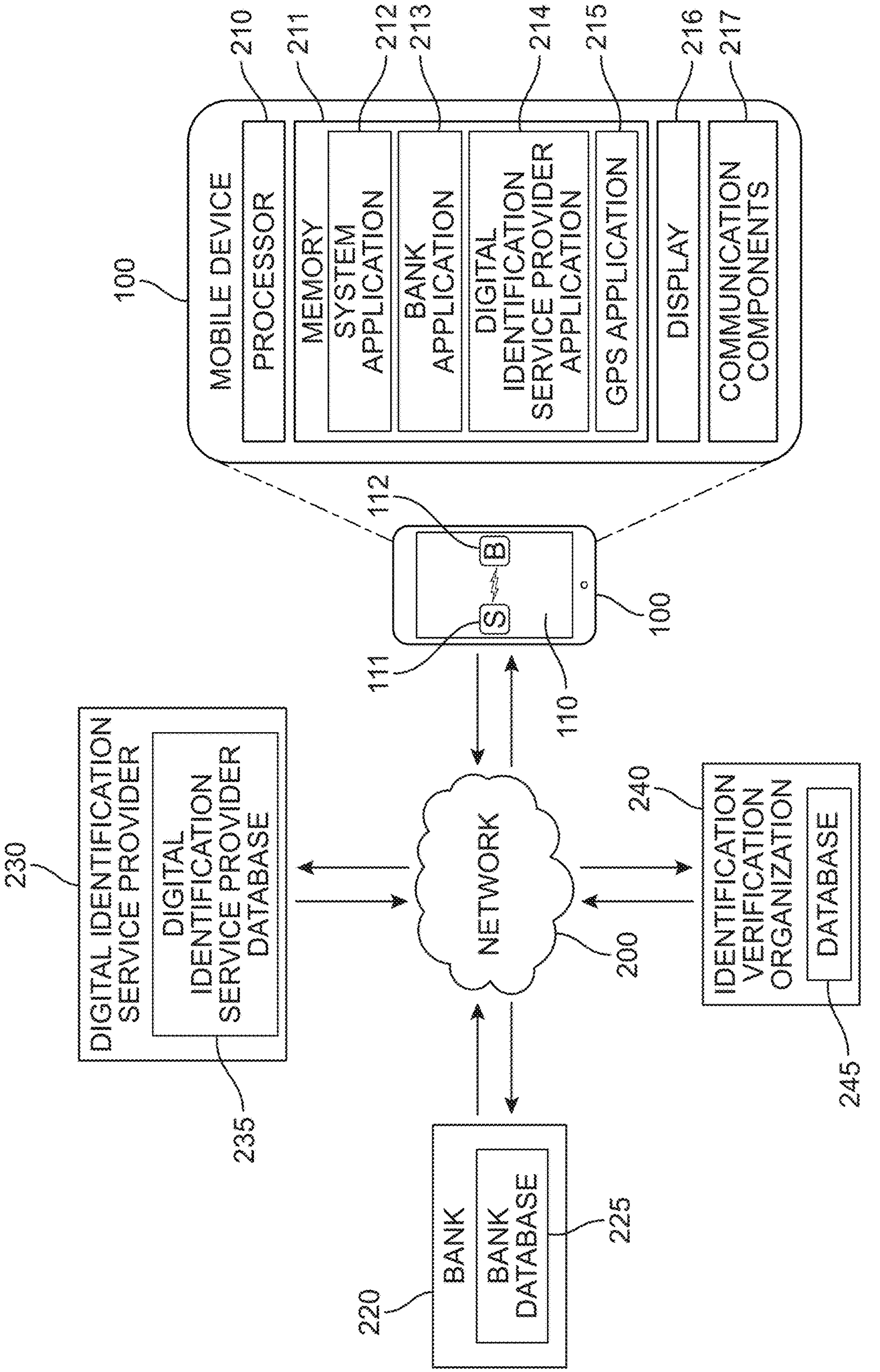
FIG. 2 is a schematic view of a mobile communication device of FIG. 1 coupled to a network according to an embodiment.

FIG. 2 is a schematic view of a mobile communication device of FIG. 1 coupled to a network 200 according to an embodiment. FIG. 2 shows the mobile communication device 100 of FIG. 1 in greater detail. The mobile computing device 100 includes a processor 210 and a memory 211. The memory 211 stores a system application 213 which includes an operating system. The memory 211 also stores a bank application 213 which corresponds to the banking application icon 112 displayed on first display image 110. The bank application 213 and banking application icon 112 are interchangeably referred to as a bank application, and the memory 211 may store one or more banking applications 213. The memory 211 also stores a digital identification service provider application 214. The digital identification service provider application 214 and the security application icon 111 are interchangeably referred to as a digital service provider application, and the memory 211 may store one or more digital identification service provider applications 214.

Figure 3:
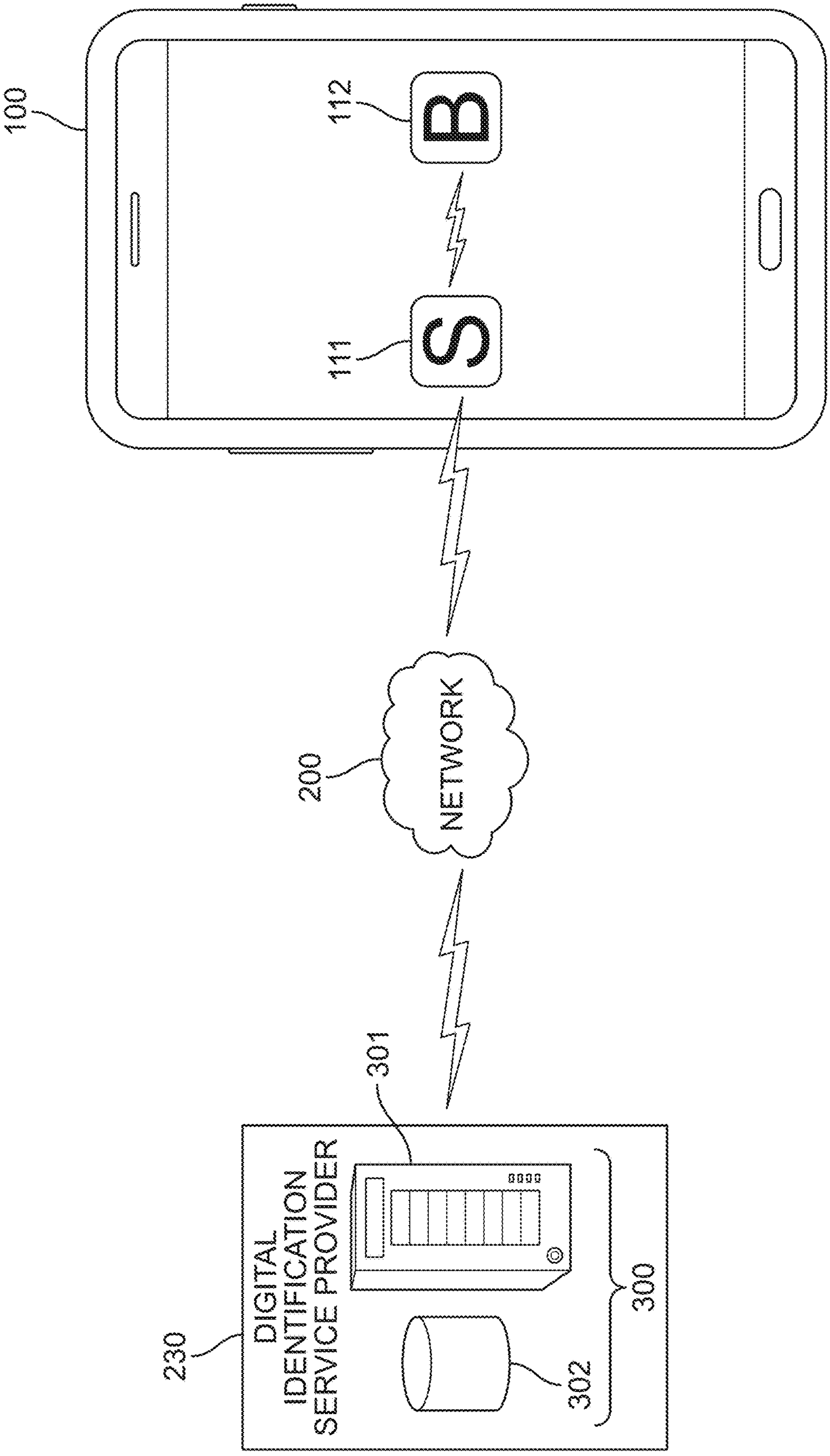
FIG. 3 is a schematic view of a digital identification service provider couple to a mobile computing device of FIG. 1 in an embodiment.

The memory also stores a global positioning system (GPS) application 215 which may provide the location of the mobile computing device 100. The mobile computing device 100 also includes a display 216 as well as communication components 217 to communication with a wireless network such as wireless network 200. The mobile computing device 100 may be coupled though network 200 to a bank 220 including a bank database 225, a digital identification service provider 230 including a digital identification server provider database 235, and an identification verification organization 240 including an identification verification organization database 245. As shown in FIG. 2, mobile computing device 100, bank 220, digital identification service provider 230 and identification verification organization 240 are coupled amongst each other and can communicate amongst each other by using network 200. In addition, bank 220, digital identification service provider 230 and identification verification organization 240 may each have a computing system and database. For example, FIG. 3 is a schematic view of a digital identification service provider 230 coupled to a mobile computing device of FIG. 1 through a network 200 in an embodiment. The digital identification service provider 230 shows a computing system 300 including a computing device 301 and a database 302 which includes digital identification service provider database 235.

Figure 4:
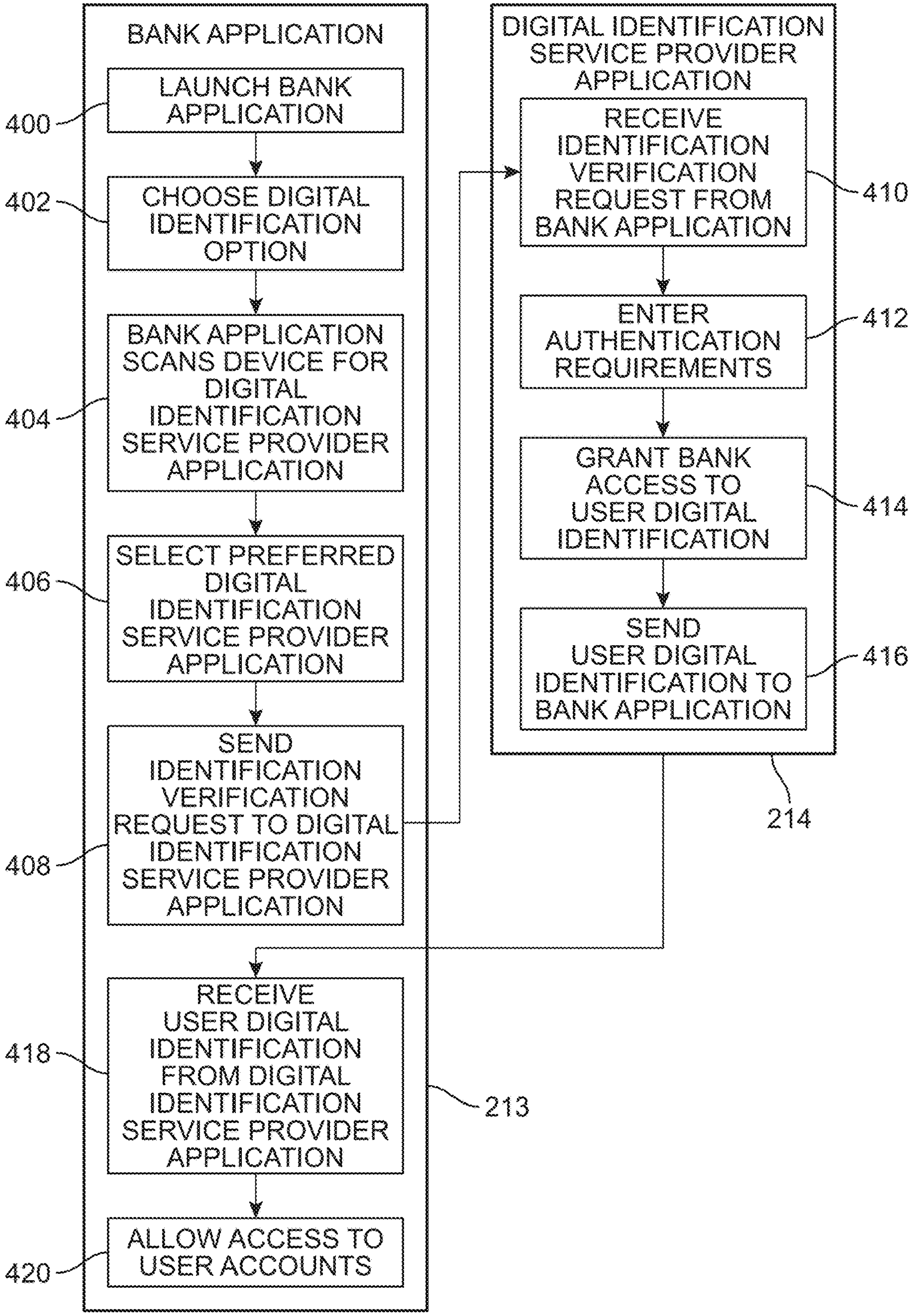
FIGS. 4 and 5 are schematic views of a process for providing proof of a digital identification according to an embodiment.
Figure 5:
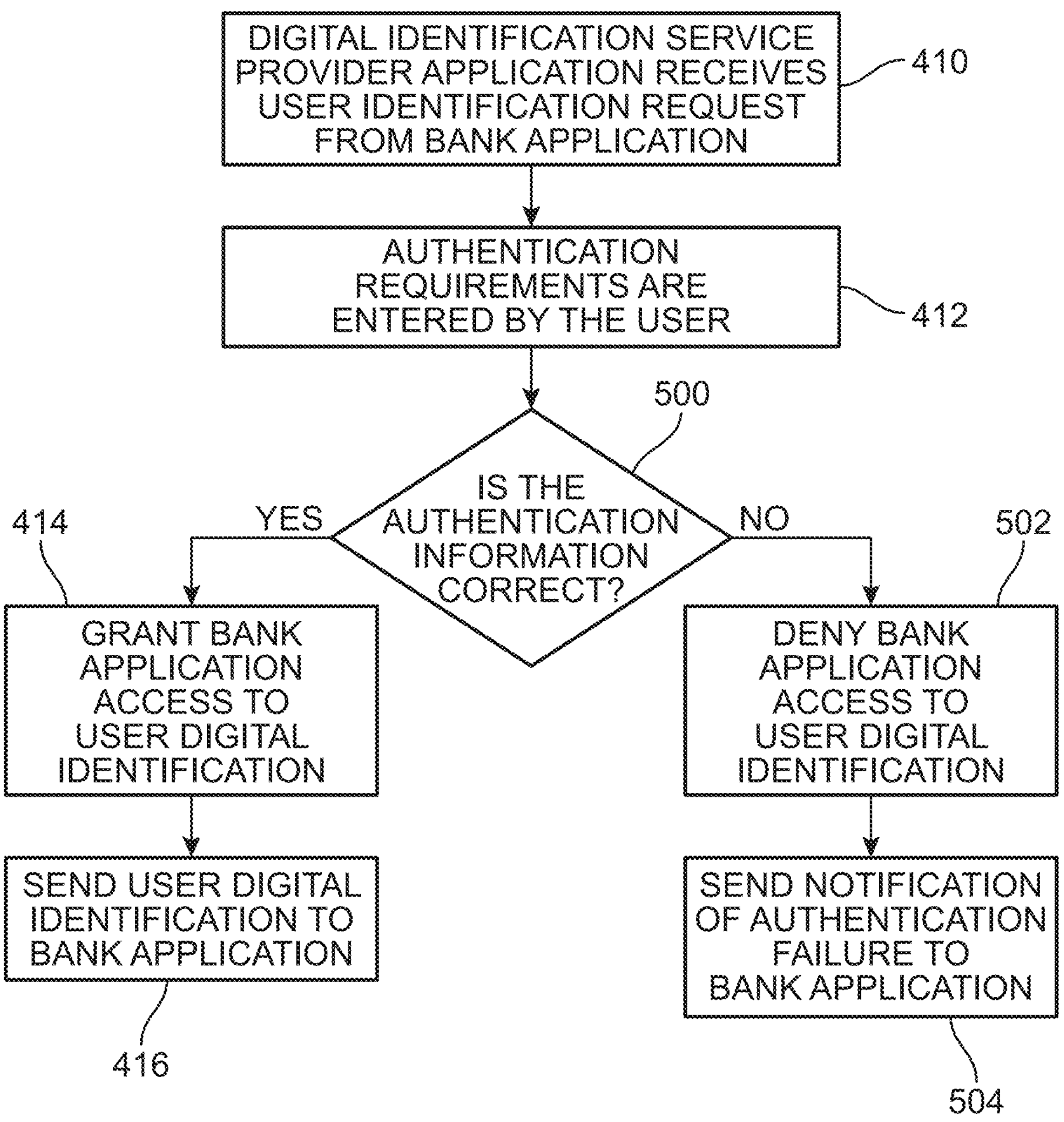

FIGS. 4 and 5 are schematic views of a process for providing proof of a digital identification according to an embodiment. A bank application such as bank application 213 in FIG. 2 may be launched (activated) by touching bank application icon 112 displayed in first display image 110 on the display screen of mobile computing device 100 (operation 400). The bank application 213 may display one or more options on the display screen, which may be selected by the user, so that the user can gain access to his or her accounts including displaying a digital identification (digital ID) option. The display may be a touch screen. After the user of the mobile computing device 100 selects the digital identification option (operation 402), the bank application 213 searches (scans) for any digital identification service provider applications 214 stored in the memory 211 of the mobile computing device 100 (operation 404). The bank application 213 causes the mobile computing device 100 to output a list of digital identification service provider applications 214, which contains one or more digital service provider applications 214. The list may be displayed on a display of the mobile computing device 100 or may be outputted by a speaker (operation 404). Through the touch screen or voice recognition of the mobile computing device 100, the user selects a digital identification service provider application 214, which may be represented by the digital identification service provider application icon 111 (operation 406).

After the user selects a digital identification service provider application 214, the bank application 213 may send an identification verification request to the selected digital identification service provider application 214 stored in the memory 211 of the mobile computing device 100 (operation 408). The selected digital identification service provider application 214 receives the identification verification request form the bank application (operation 410). The user of the mobile communication device 100 may enter the required authentication information by using the mobile computing device (operation 412).

More specifically, with reference to FIG. 2, selected digital identification service provider application 214 of the mobile computing device 100 may communicate with the computer system of the identification verification organization 240 through network 200. The identification verification organization 240 may request that the user of the mobile computing device 100 supply authentication information such as a pin code followed by a security key or biometric identification so that the identification verification organization 240 can access the identification verification organization database 245 storing the digital identity profiles. Alternatively, a digital identity profile with sufficient information may be stored in the database 235 at the digital identification service provider 230, and the digital identification service provider application 214 may retrieve the digital identity profile from the digital identification provider as shown in FIG. 3.

In order to enable a user of the mobile computing device 100 to grant the bank application 213 access to the digital identify of the user, the identification verification organization 240 or the digital identification service provider 230 may transmit the digital identification of the user to the mobile computing device 100 so that the digital identification service provider application 214 can cause the mobile computing device 100 to display the digital identification information on the display of the mobile computing device 100. The digital identification information displayed on the display of the mobile computing device 100 may be the digital identification information which the bank application 213 requires to access one or more accounts by the bank application 213. This digital identification information provides a digital proof of identity (digital identity). The user has the opportunity to review the digital identification information (proof of identity) on the display of the mobile computing device 100 and the digital identification service provider application 214 can prompt the user of the mobile device to grant the bank application 213 access to one or more of the user accounts on the display of the mobile computing device 100 (operation 500).

By selecting the grant to bank access through the touchscreen of the display of the mobile computing device (operation 414), the user transmits a digital identification (digital identity or proof of identity) to the bank application 213 (operation 416). However, if the user in operation 500 reviews the digital identification information and the digital identity information is not accurate, the user can deny the bank application access to the digital identification information (operation 502). For example, the user may not select the prompt to grant the bank application 213 access to the digital identification information (operation 502), and the digital identification service provider application 214 may send a notification to the bank application 213 of a failure to authenticate the digital identification information (operation 504).

As discussed above, by selecting the grant to bank access through the touchscreen of the display of the mobile computing device (operation 414), the user transmits a digital identification (digital identity or proof of identity) to the bank application 213 (operation 416). The bank application 213 receives the digital identification information from the digital identification service provider application (operation 418). The bank application 213, which is coupled to the bank 220 through network 200, can now transmit the digital identification information to the bank 220, which can allow access to accounts of the bank to the user (operation 420) because the banking application 213 now has the digital identity of the user. Once the banking application 213 has the digital identify of the user, the user of the mobile computing device 100 can quickly and securely access user accounts of the bank at any time which is convenient for the user by way of the mobile computing device 100.

FIGS. 6-13 show schematic views of a mobile communication device 100 which show examples of displays on a display 216 of a mobile communication device 100 as the bank application 213 and digital identification service provide application 214 process a request for a digital identification (digital identity) for the bank application 213 so that the user of the mobile device can access accounts held by a bank of the user.

Figure 6:
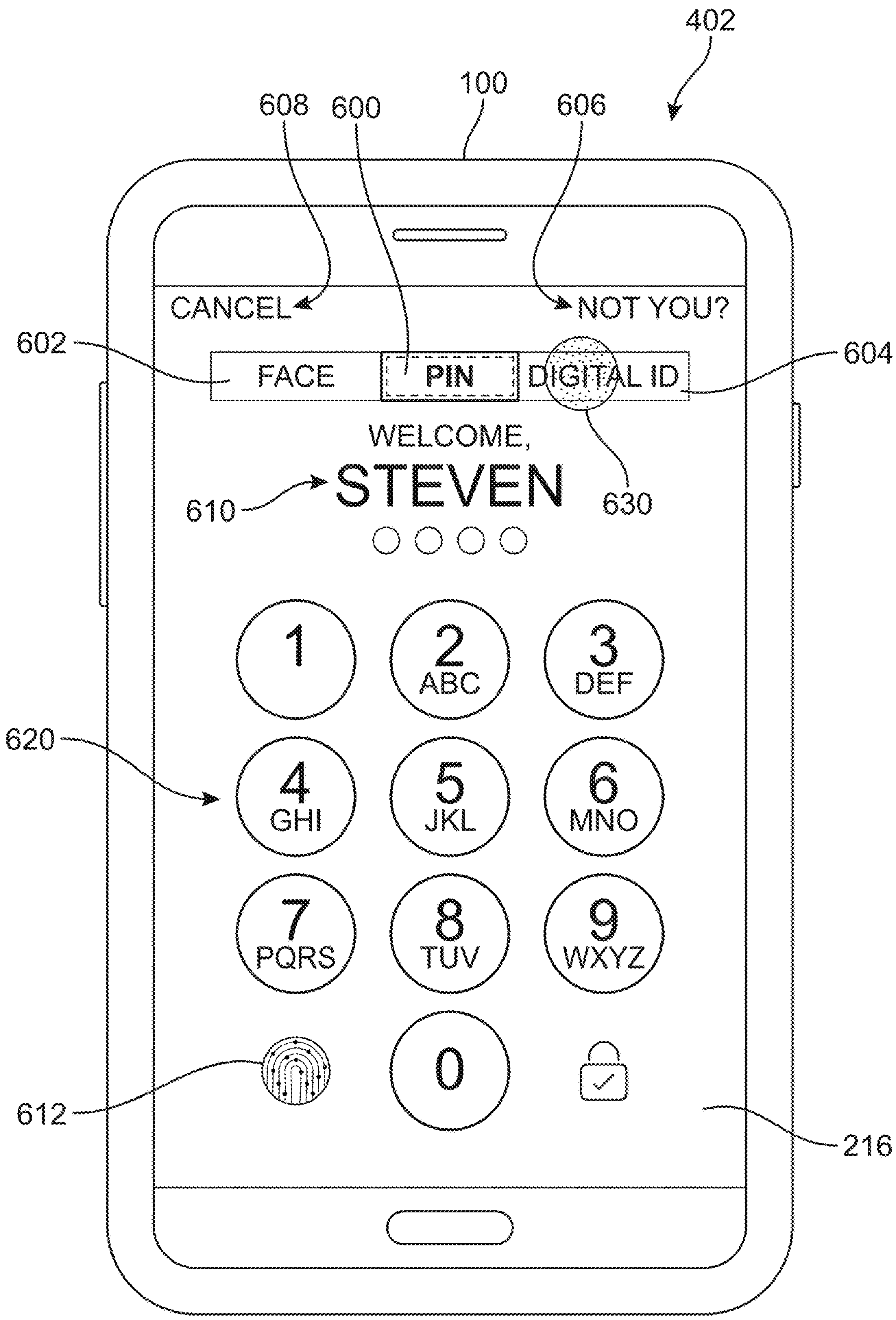
FIG. 6 is a schematic view of a mobile communication device of FIG. 1 which shows displaying a request for one or more digital identification service provider applications stored on the mobile computing device according to an embodiment.

FIG. 6 is a schematic view of a mobile communication device 100 of FIG. 1 which shows displaying a list of options including a request for one or more digital identification service provider applications 214 stored on the mobile computing device 100 according to an embodiment (operation 402). The mobile computing device 100 displays on a display 216 a pin option 600, a face option 602, and a digital ID option 604 after the banking application is activated (launched) in operation 400. The pin option 600 may be used to enter the pin of the user, which may be followed by a requirement to enter a security key sent by text or by email to the mobile computing device 100. The face option 602 is facial recognition. The digital ID (digital identification) option 604 provides the quickest and most secure method of accessing one or more user accounts through the banking application 213.

The mobile computing device 100 also displays a "CANCEL" option 608 providing the user with capability of ending the bank application or the selected process at anytime. In addition, the mobile computing device 100 displays a "NOT YOU?" option 606 to allow the user of the mobile computing device 100 to change the user of the mobile computing device 100 because more than one user of the mobile computing device 100 may be recognized or added. For example, a name "STEVEN" 610 is displayed on the mobile computing device 100. If the name of the user is not "STEVEN", then the user of the mobile computing device 100 can activate (e.g. touch) "NOT YOU?" option 606 to change the user name.to another user of the mobile computing device 100. In addition to the pin option 600, face option 602, and digital ID option 604, the bank application 213 also causes the mobile computing device 100 to display a touch option 612 for fingerprint identification. In order to use the pin option 600, the bank application causes the mobile computing device 100 to display the alphanumeric keys 620 to input a password, security code, pin, etc.

Figure 7:
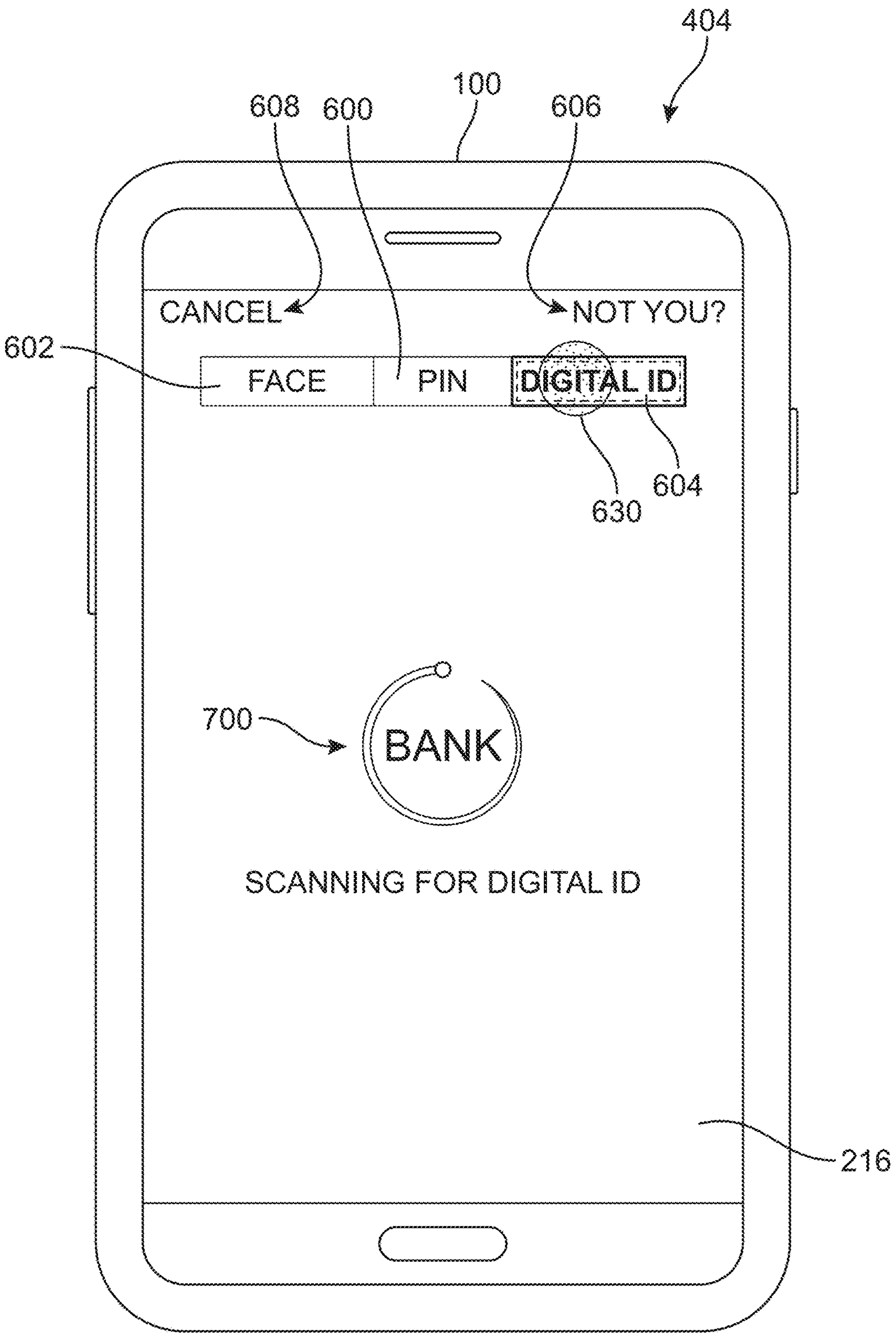
FIG. 7 is a schematic view of a mobile communication device of FIG. 1 which shows displaying a scan of the mobile computing device for one or more digital identification service provider applications stored on the mobile computing device according to an embodiment.

FIG. 7 is a schematic view of a mobile communication device 100 of FIG. 1 which shows displaying a scan of the mobile computing device 100 for one or more digital identification service provider applications 214 stored on the mobile computing device 100 according to an embodiment. Both FIG. 6 and FIG. 7 show that the user has selected the digital ID option 604 using a touch screen of display 216. The selection of the digital ID is denoted by reference numeral 630 in both FIG. 6 and FIG. 7. FIG. 7 also displays on the display 216 that the bank application 213 is currently scanning for digital identification service provider applications 214 as denoted by reference numeral 700 and the language "SCANNING FOR DIGITAL ID", which is the operation 404 in FIG. 4.

Figure 8:
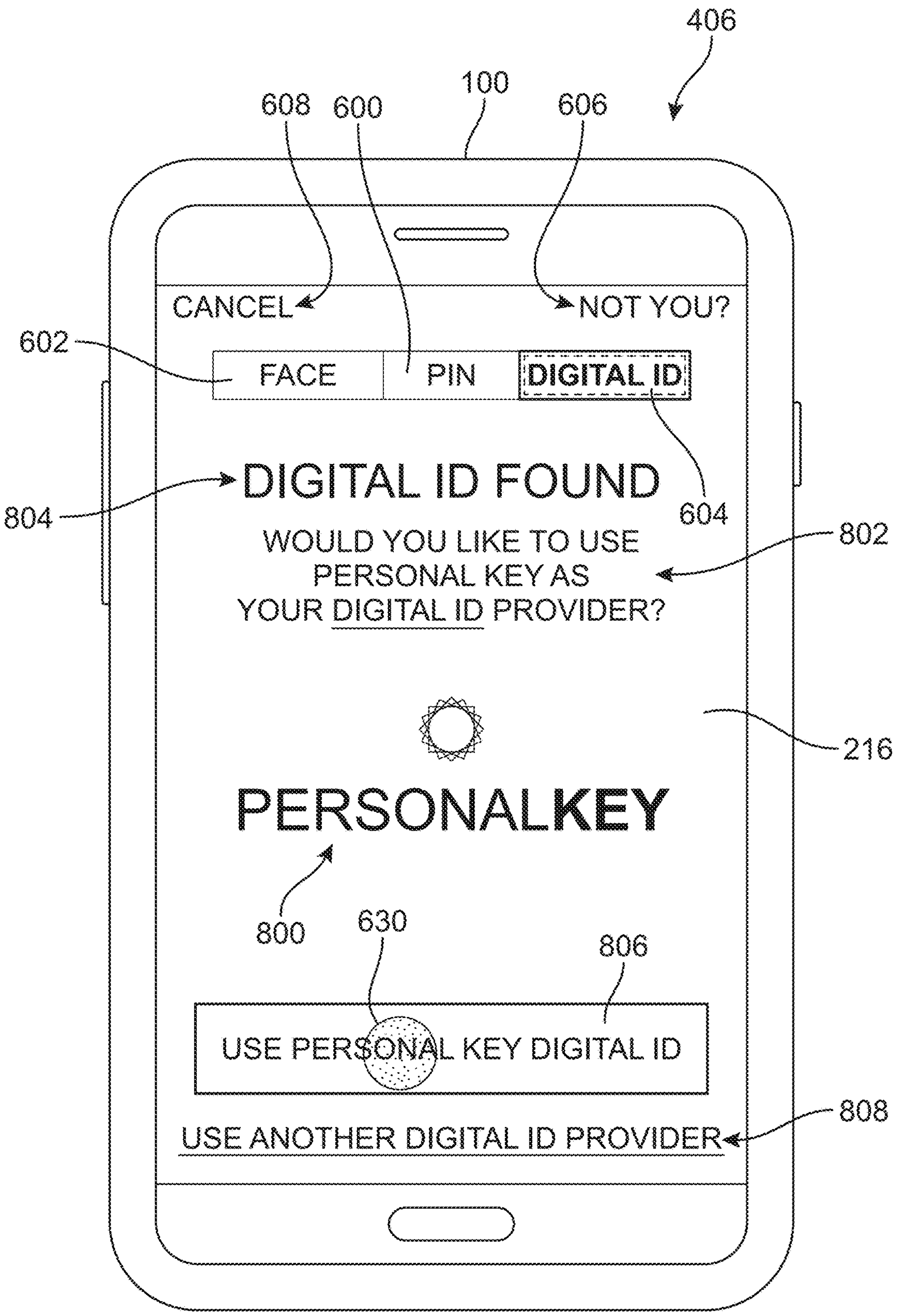
FIG. 8 is a schematic view of a mobile communication device of FIG. 1 which shows displaying a list of one or more digital identification service provider applications stored on the mobile computing device according to an embodiment.

FIG. 8 is a schematic view of a mobile communication device 100 of FIG. 1 which shows displaying a list of one or more digital identification service provider applications 214 stored on the mobile computing device according to an embodiment. In FIG. 8, digital identification service provider applications 214 are detected by the banking application 213 from the scanning operation of operation 404. One of digital identification service provider application 214 shown in FIG. 8 in this example is called "PERSONAL KEY" 800, which is associated with an identification verification organization 240. Other digital identification service provider applications 214 may be denoted by reference numeral 808. The mobile computing device 100 displays that a digital ID was found as denoted by reference numeral 804 and displays the question to the user of whether the user wishes to use "PEROSONAL KEY" as the digital ID provider 802. FIG. 8 displays the option of selecting "PERSONAL KEY" as the digital ID provider as denoted by reference numeral 806 and displays the option of selecting another digital ID provider as denoted by reference numeral 808. As indicated in FIG. 8, the selection of the "PERSONAL KEY" as the digital ID provider is denoted by reference numeral 630 (operation 406), and this selection is transmitted from the bank application 213 and received by the digital identification service provider application 214 associated with "PERSONAL KEY" (operations 408 and 410).

Figure 9:
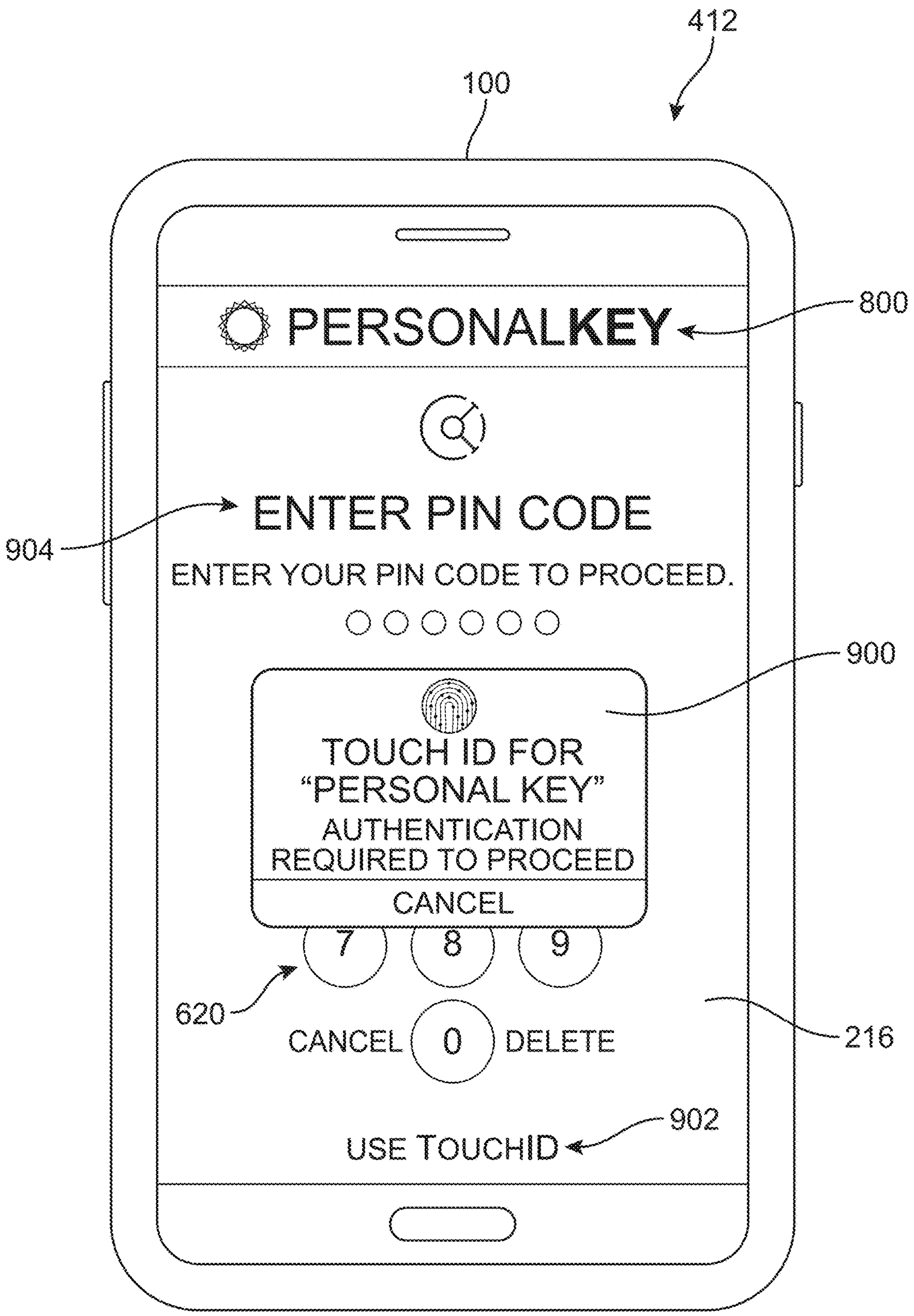
FIG. 9 is a schematic view of a mobile communication device of FIG. 1 which shows displaying options for accessing a selected digital identification service provider application stored on the mobile computing device according to an embodiment.

FIG. 9 is a schematic view of a mobile communication device 100 of FIG. 1 which shows displaying options for accessing a selected digital identification service provider application 214 stored on the mobile computing device 100 according to an embodiment. The digital identification service provider application 214 of the digital identification service provider "PERSONAL KEY" 800 requests that the user of the mobile computing device 100 enter information based on the authentication requirements of the digital identification service provider "PERSONAL KEY" 800 (operation 412). For example, a touch ID may be a first authentication option as denoted by reference numerals 900 and 902. A second authentication option may be to enter a PIN codes as denoted by reference numeral 904. However, the digital identification service provider "PERSONAL KEY" 800 may require more than one option. Additionally, it is understood that other forms of biometric identification may be required, or entry of a password and/or security key may be required.

Figure 10:
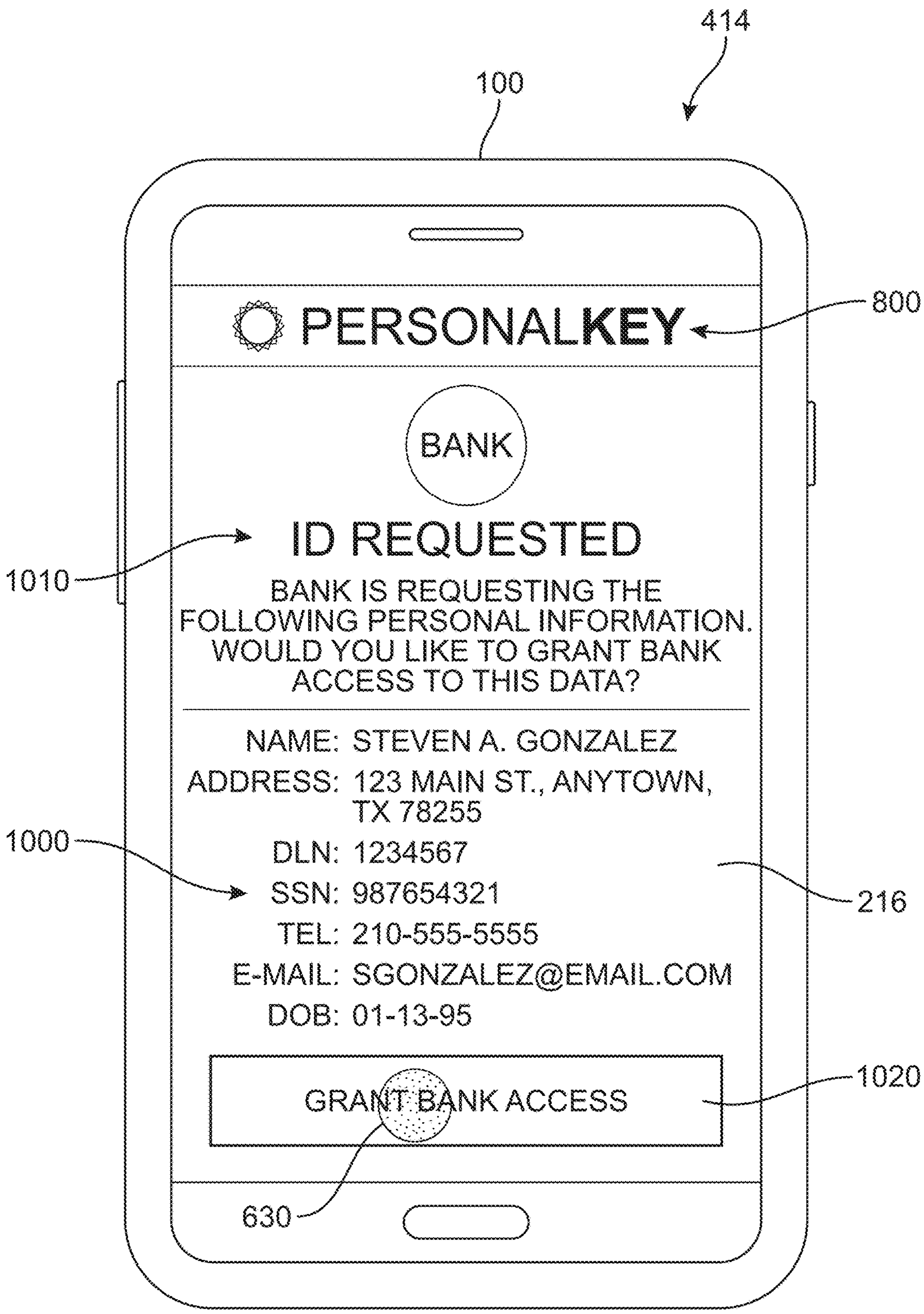
FIG. 10 is a schematic view of a mobile communication device of FIG. 1 which shows information from a digital identification of the user and shows selection of approval of the user to grant a bank application access to the digital identification according to an embodiment.

FIG. 10 is a schematic view of a mobile communication device 100 of FIG. 1 which shows information from a digital identification of the user and shows selection of approval of the user to grant a bank application 213 access to the digital identification according to an embodiment. As indicated in FIG. 10, the digital identification service provider application 214 of the digital identification service provider "PERSONAL KEY" 800 may cause the mobile communication device 100 to display digital identification information (digital identity) of a user provided by PERSONAL KEY 800. The digital identification service provider application 214 may also cause the mobile computing device 100 to display the source of the request, which is the bank application 213 as denoted by reference numeral 1010. By touching denoted by reference numeral 630 the prompt "GRANT BANK ACCESS" denoted by reference numeral 1020 (operation 414), the digital identification service provider application 214 of the digital identification service provider "PERSONAL KEY" 800 transmits the digital identification to the bank application 213 (operation 416), which is received by the bank application 213 (operation 418).

Figure 11:
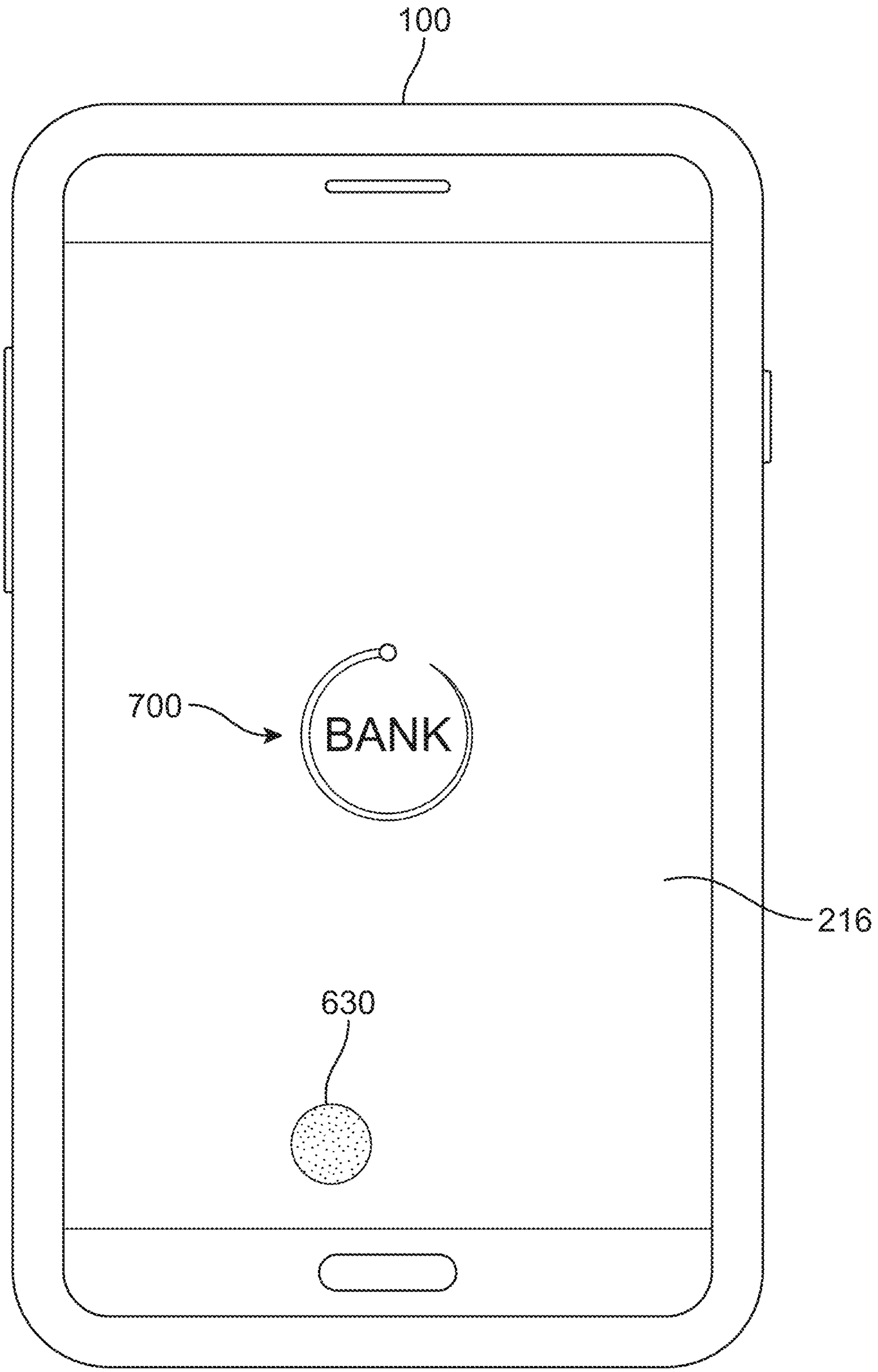
FIG. 11 is a schematic view of a mobile communication device of FIG. 1 which shows a bank application accessing the digital identification according to an embodiment.
Figure 12:
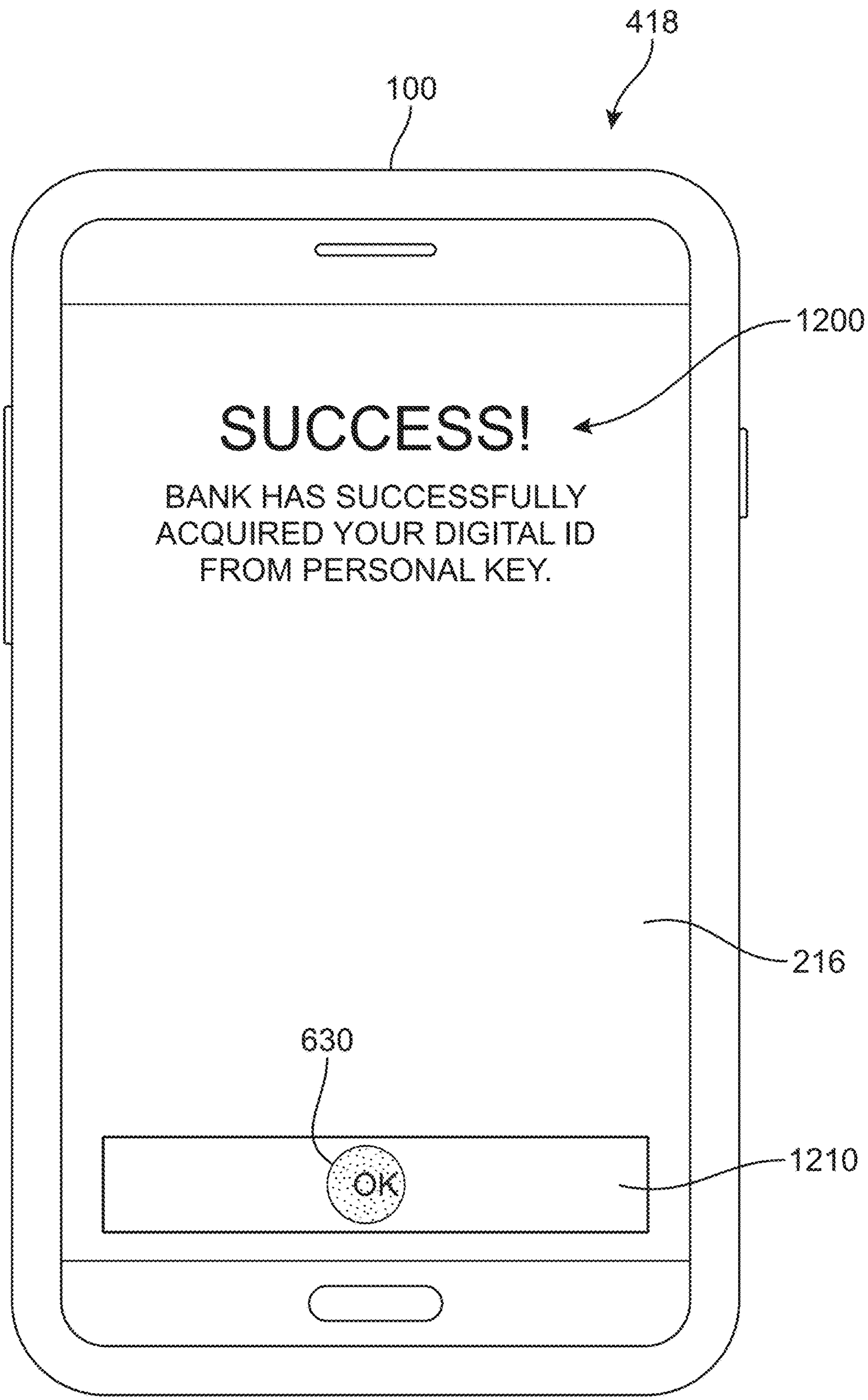
FIG. 12 is a schematic view of a mobile communication device of FIG. 1 which shows a bank application displaying a message of a bank application successfully accessing the digital identification according to an embodiment.

FIG. 11 is a schematic view of a mobile communication device100 of FIG. 1 which shows a bank application 213 accessing the digital identification according to an embodiment. The processing is displayed by the image denoted by reference numeral 700 in FIG. 11 followed by the display in FIG. 12. FIG. 12 is a schematic view of a mobile communication device 100 of FIG. 1 which shows a bank application 213 displaying a message 1200 of a bank application successfully accessing the digital identification according to an embodiment. FIGS. 11 and 12 illustrate operation 418 in FIG. 4.

Figure 13:
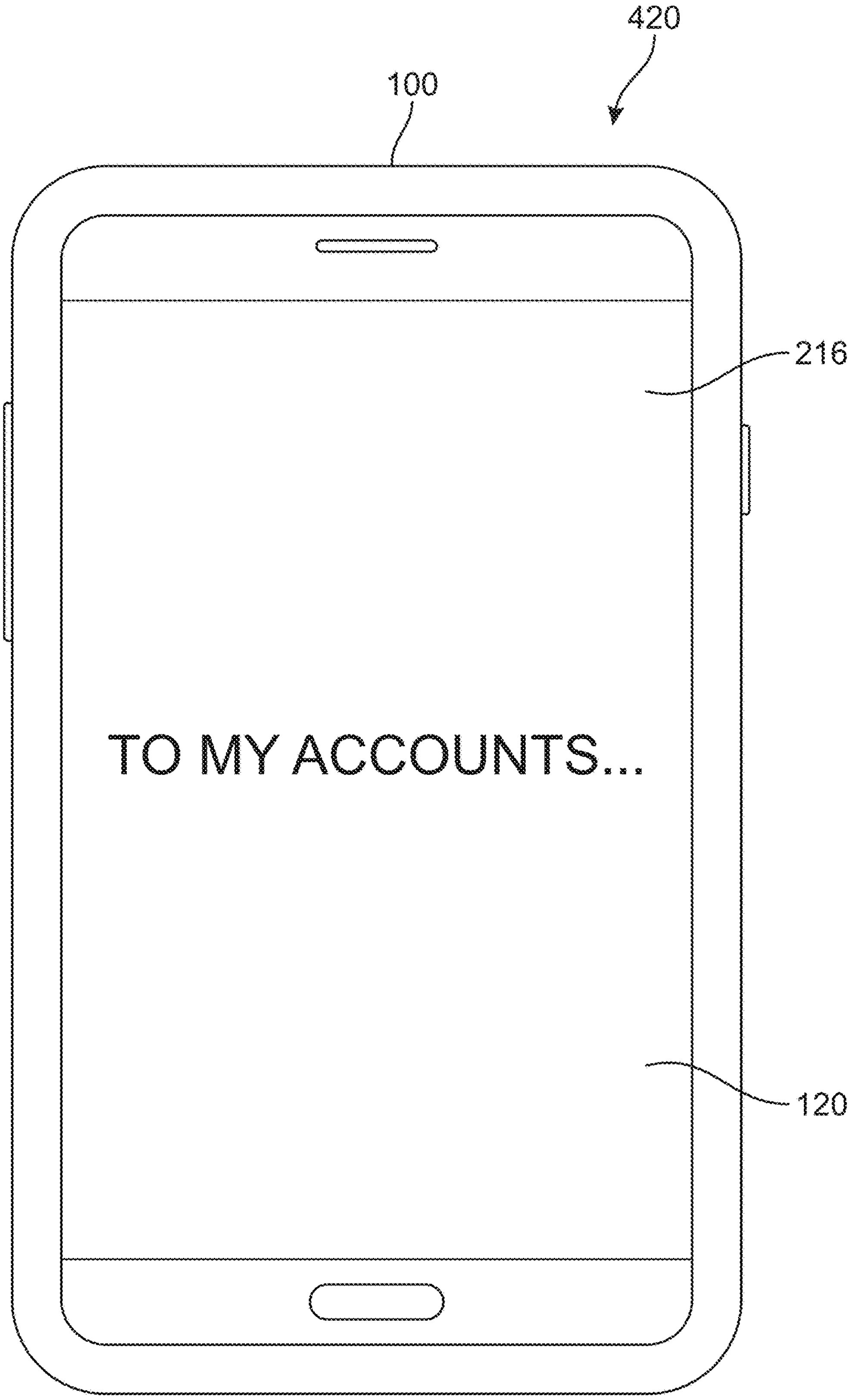
FIG. 13 is a schematic view of mobile communication device of FIG. 1 indicating access to user accounts by the bank application according to an embodiment.

FIG. 13 is a schematic view of mobile communication device of FIG. 1 indicating access to user accounts by the bank application according to an embodiment. By touching the prompt denoted by reference numeral 1210 in FIG. 12, the process allows access to the user accounts as shown in the second display image in FIG. 1 and FIG. 13 and described above with respect to operation 420 in FIG. 4.

It may be appreciated that the above systems and methods may apply not only to bank applications but also to any applications requesting a digital identity, and any computing device and any network may be used to implement the above systems and methods. It is also understood that various icons can be displayed on the display of the mobile computing device or other computing devices implementing the methods and systems in embodiments.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of authenticating a user with a mobile computing device comprising:

running a requesting application on the mobile computing device;

receiving a selection input from the user of a digital identification service provider application;

requesting, by the selected digital identification service provider application running on the mobile computing device, authentication information from the user, the authentication information being in the form of a biometric identification;

receiving, by the selected digital identification service provider application running on the mobile computing device, the authentication information;

authenticating, by the selected digital identification service provider application running on the mobile computing device, the authentication information using a digital identification service provider database;

retrieving, by the selected digital identification service provider application running on the mobile computing device, digital identification information from the digital identification service provider database upon authentication of the authentication information;

displaying, by the selected digital identification service provider application, for the user, the set of digital identification information on the mobile computing device;

prompting, by the selected digital identification service provider application, the user to grant the requesting application access to the set of digital identification information by making an input on the mobile computing device;

transmitting, by the digital identification service provider application, the digital identification information to the requesting application after receiving the information indicating the user has granted access to the set of digital identification information; and accessing, by the requesting application, a user account using the digital identification information, wherein the access is conditioned on the requesting application receiving the digital identification information transmitted by the digital identification service provider application.

2. The method of claim 1, wherein the accessing comprises accessing a bank account of the user.

3. The method of claim 1, further comprising displaying, by the mobile computing device, a user interface corresponding to a selection for inputting the authentication information.

4. The method of claim 1, further comprising displaying information identifying an organization requesting the authentication information.

5. The method of claim 1, further comprising:

displaying, by the mobile computing device, the authentication information; and prompting an input from the user prior to causing the transmitting, by the digital identification service provider application, the digital identification information to the requesting application.

6. The method of claim 1, further comprising displaying an indication of a receipt, by the requesting application, of the digital identification information.

7. The method of claim 1, further comprising maintaining the digital identification service provider database by a digital identification service provider remote from the mobile computing device.

8. The method of claim 1, further comprising displaying, by the mobile computing device, a control configured to cause the mobile computing device to end the requesting application.

9. A method of authenticating a user with a mobile computing device comprising:

running a requesting application on the mobile computing device;

receiving a selection input from the user of a digital identification service provider application;

requesting, by the selected digital identification service provider application running on the mobile computing device, authentication information from the user, the authentication information being in the form of a biometric identification;

receiving, by the selected digital identification service provider application running on the mobile computing device, the authentication information;

authenticating, by the selected digital identification service provider application running on the mobile computing device, the authentication information using a digital identification service provider database;

wherein the digital identification service provider database is maintained by a digital identification service provider remote from the mobile computing device, and the digital identification service provider is one of a state government agency and a federal government agency;

retrieving, by the selected digital identification service provider application running on the mobile computing device, digital identification information from the digital identification service provider database upon authentication of the authentication information;

displaying, by the selected digital identification service provider application, for the user, the set of digital identification information on the mobile computing device;

prompting, by the selected digital identification service provider application, the user to grant the requesting application access to the set of digital identification information by making an input on the mobile computing device;

transmitting, by the digital identification service provider application, the digital identification information to the requesting application after receiving the information indicating the user has granted access to the set of digital identification information; and accessing, by the requesting application, a user account using the digital identification information, wherein the access is conditioned on the requesting application receiving the digital identification information transmitted by the digital identification service provider application.

10. The method of claim 9, wherein the digital identification service provider is one of a state Department of Motor Vehicles, a federal Department of Homeland Security, and a federal Department of Defense.

11. The method of claim 9, wherein the digital identification service provider is a state Department of Motor Vehicles.

12. The method of claim 9, wherein the method further comprises displaying, by the mobile computing device, one or more biometric options for inputting the authentication information selected from facial recognition, fingerprint recognition, and voice recognition.

13. The method of claim 9, wherein the accessing comprises accessing a bank account of the user.

14. The method of claim 9, wherein the requesting application is associated with a financial institution.

* * * * *